Jan. 15, 1963          R. H. GRANT          3,073,193
PORTABLE MACHINE SHOP APPARATUS
Filed Jan. 9, 1959                    5 Sheets-Sheet 1
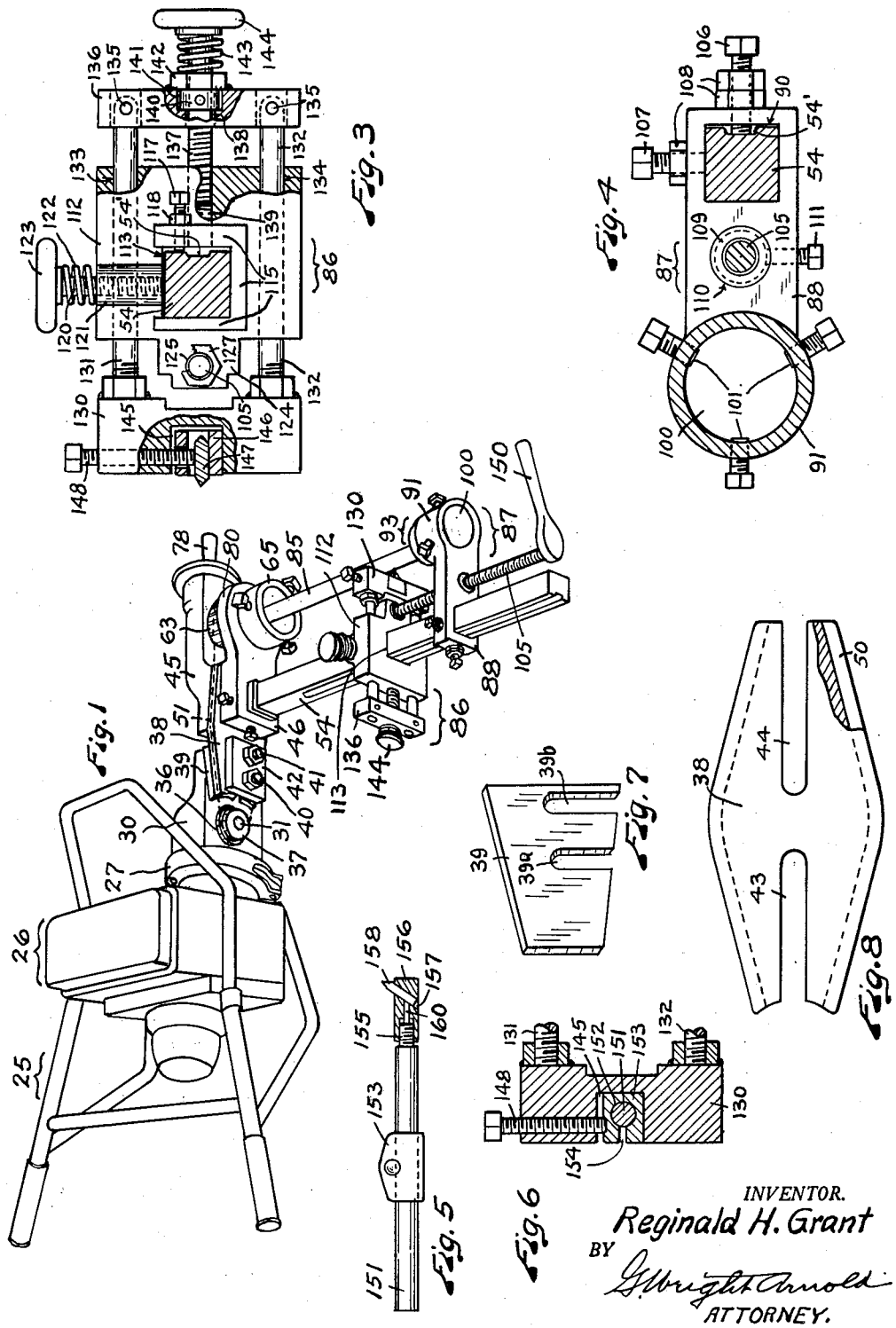
INVENTOR.
Reginald H. Grant
BY
ATTORNEY.

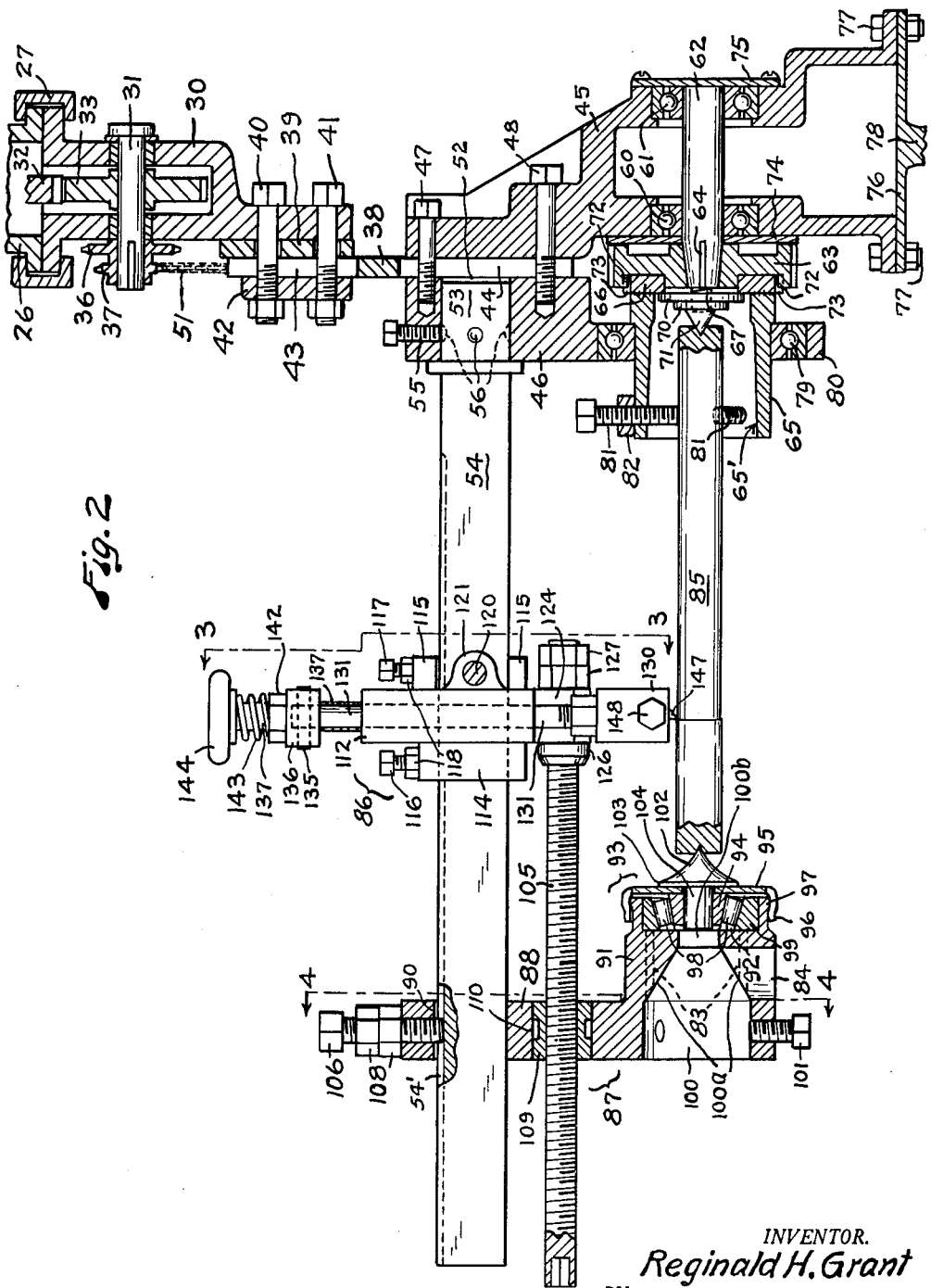

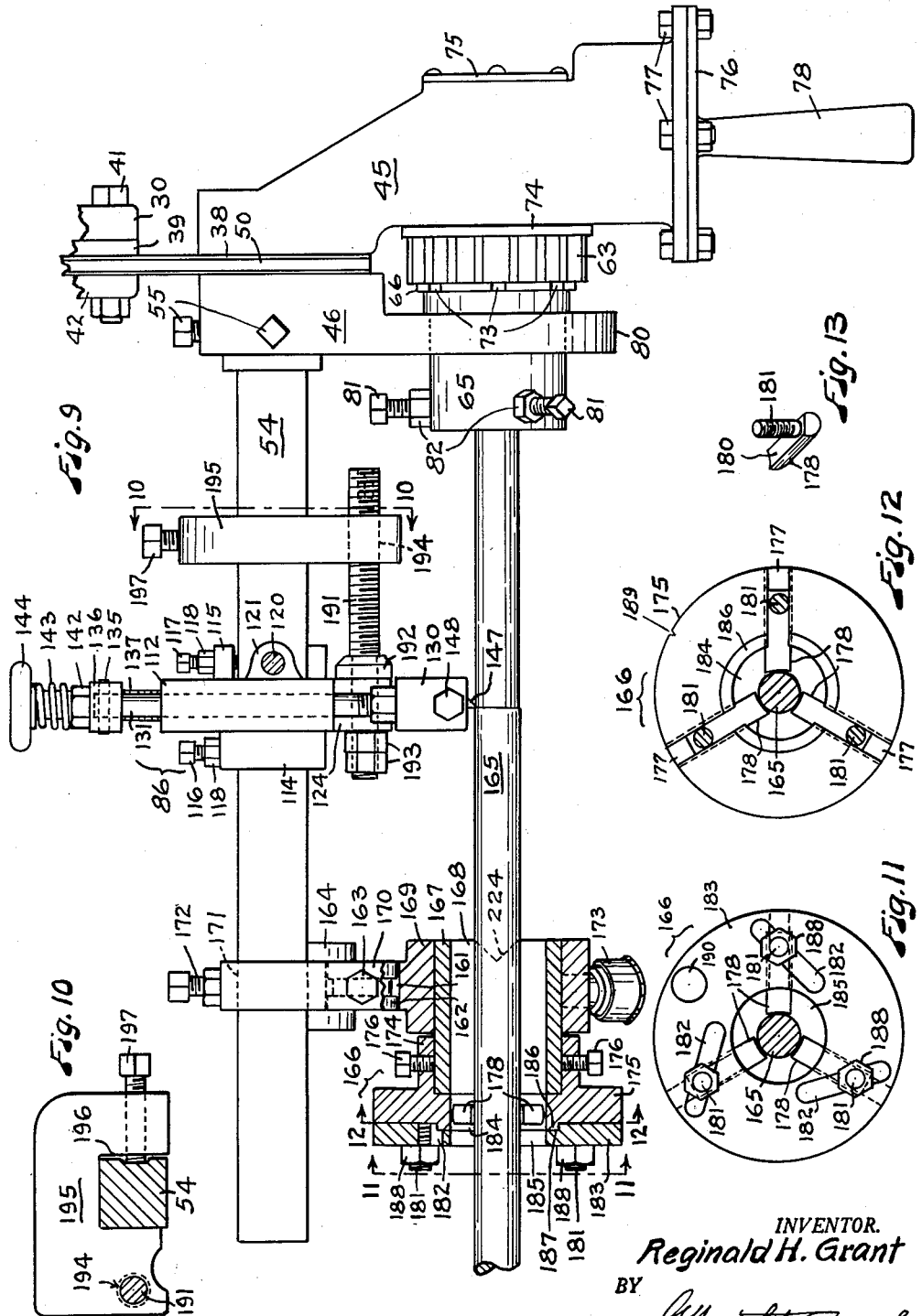

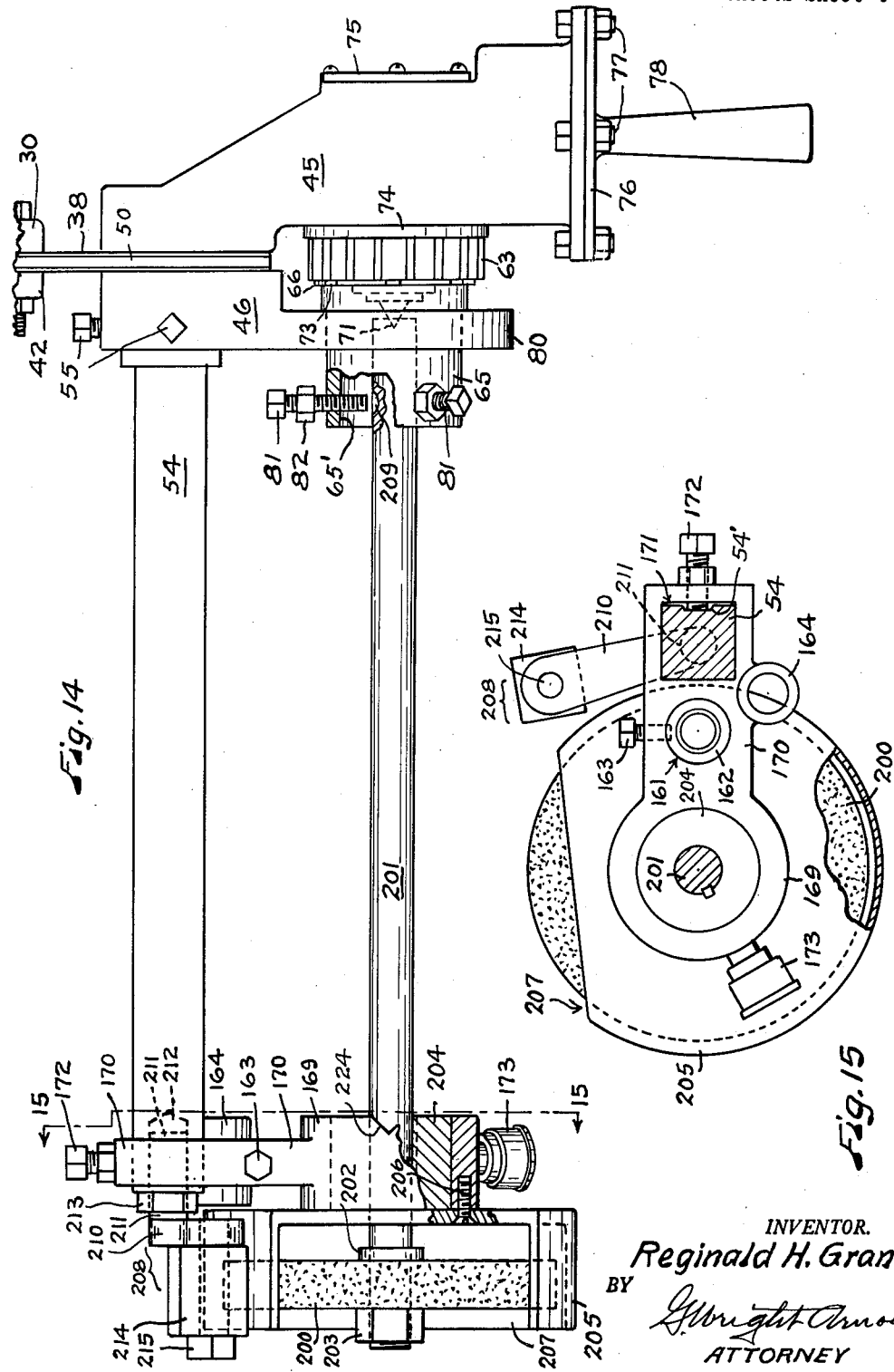

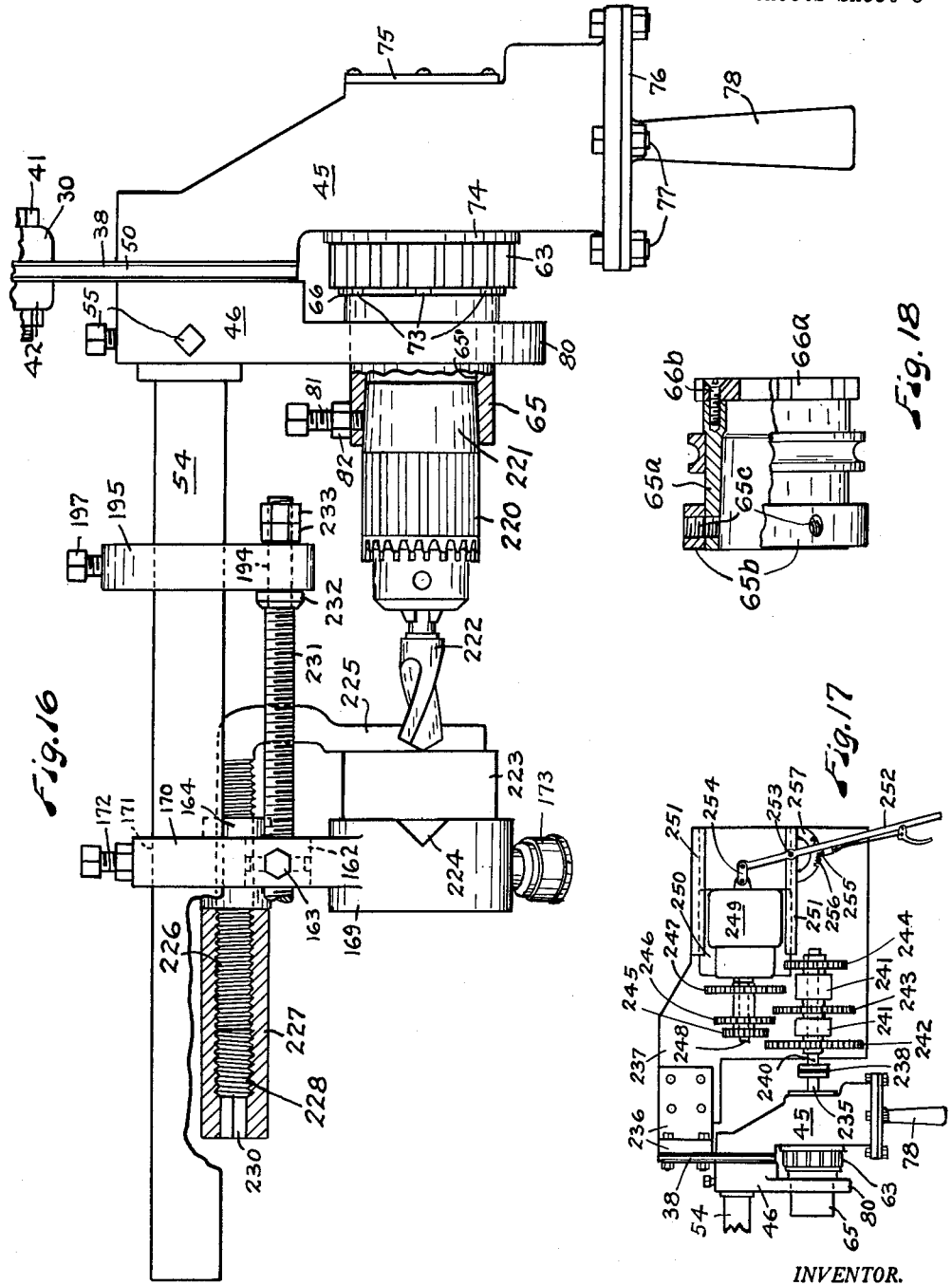

United States Patent Office 3,073,193
Patented Jan. 15, 1963

3,073,193
PORTABLE MACHINE SHOP APPARATUS
Reginald H. Grant, 1850 Myrtle Ave., Eureka, Calif.
Filed Jan. 9, 1959, Ser. No. 785,823
5 Claims. (Cl. 82—2)

My invention relates to portable machine shop apparatus.

An object of my invention is to provide portable machine shop apparatus which is designed so that it can be attached to and operated by the power unit of a portable chain saw and which is capable of being used for light machine shop work such as turning, boring, drilling, grinding and similar work ordinarily done in a machine shop.

Portable chain saws having internal combustion type power units are used extensively in the woods in logging and like operations. These operations are often carried out in areas where transportation facilities are limited and machine shop service is not available. Also they are sometimes carried out by persons who, for economic reasons, do not have machine shop tools, such as a lathe, drill press or grinder. One object of my invention is to provide a portable assembly of machine shop tools which are accurate, reliable, durable, easy to use and not expensive to manufacture and which can quickly and easily be connected with the power unit of a chain saw and used to do machine shop work of the type which is liable to be required in the woods and like places where portable chain saws are used.

Other objects are to provide novel and efficient means for connecting my machine shop means with the power unit of a chain saw, said means including change speed devices between the power unit and the machine shop means.

The above mentioned general objects of my invention, together with others inherent in the same, are attained by the mechanism illustrated in the following drawings, the same being preferred exemplary forms of embodiment of my invention, throughout which drawings like reference numerals indicate like parts:

FIGURE 1 is a somewhat diagrammatic view in perspective showing my machine shop attachment applied to the power unit of a chain saw, the attachment being equipped with a work piece and tools for doing lathe work on the same.

FIG. 2 is a view partly in section and partly in plan of my machine shop attachment, with work piece and lathe tools shown in FIG. 1, but on a larger scale than FIG. 1 and with only a fragment of the chain saw power unit shown.

FIG. 3 is a view partly in section and partly in elevation taken substantially on broken line 3—3 of FIG. 2 and showing a tool carrying arm used in lathe work.

FIG. 4 is a view partly in elevation and partly in section taken on broken line 4—4 of FIG. 2 and showing a bearing supporting arm.

FIG. 5 is a detached elevation with parts in section, showing a boring tool which can be used with the lathe devices for boring work within a tubular part.

FIG. 6 is a fragmentary sectional view of a part of the tool carrying arm shown in FIG. 3 and showing the tool holder and boring bar of FIG. 5 held in a tool receiving notch of said part.

FIG. 7 is a detached perspective view of a speed adjusting plate used to change gear ratio by changing alignment of a drive chain from a driven sprocket pinion of one size to a driven sprocket pinion of a different size.

FIG. 8 is a detached elevational view, with parts broken away, showing a combined chain guide and mounting plate.

FIG. 9 is a plan view with parts in cross section, showing a lathe attachment set up of modified form for turning a long work piece, this set up using a self centering clamp for the work piece and using feed screw devices of modified form;

FIG. 10 is a view partly in elevation and partly in section, taken substantially on broken line 10—10 of FIG. 9 and showing a clamp arm for holding a feed screw;

FIG. 11 is an elevational view on line 11—11 of FIG. 10, showing a self centering clamp used in holding a long work piece on which turning work is being done and showing the work piece in cross section;

FIG. 12 is a view partly in section and partly in elevation, on line 12—12 of FIG. 10 showing said self centering clamp;

FIG. 13 is a detached perspective view of a work holding dog used in said self centering clamp;

FIG. 14 is a plan view, with parts in section, showing my machine shop attachment set up and equipped as it would be when used as a grinder;

FIG. 15 is a view partly in section and partly in elevation, taken substantially on line 15—15 of FIG. 14, showing a bearing supporting arm, a shield for a grinder wheel, a fragment of the wheel, and a tool rest;

FIG. 16 is a top plan view, with parts in section showing this machine set up for use as a drill press;

FIG. 17 is a schematic plan view showing an application of an electric motor and change speed gears to this machine; and FIG. 18 is a detached fragmentary view partly in section and partly in elevation showing a collet of modified form.

FIGURE 1 shows, somewhat diagrammatically, my invention applied to the power unit of a conventional portable chain saw. Briefly the chain saw power unit comprises an open frame 25 assembled around an internal combustion motor 26. The power unit of the chain saw is ordinarily connected with the blade carrying part of the saw by a readily detachable yoke 27, which is a standard part of the chain saw and which I utilize as a means of connecting my machine shop attachment with the chain saw power unit. This yoke 27 is shown in FIGS. 1 and 2. In accordance with my invention I provide a frame member or transmission housing 30 of modified form, which replaces a similar frame part of the chain saw and is secured to the motor 26 by the readily detachable yoke 27. The transmission housing 30 journaled therein and this shaft 31 is driven from the motor 26 by suitable means, such as two or more gears 32 and 33.

On the cross shaft 31 I fixedly secure two sprocket wheels 36 and 37 of different size which are positioned close together and alongside of each other and make possible a change in the gear ratio between the motor 26 and the machine tool parts or work driven thereby. An endless sprocket chain 51, shown diagrammatically in FIGS. 1 and 2, operates on either selected one of the sprocket wheels 36 and 37 for driving purposes.

A combined chain guide and mounting plate 38, shown detached in FIG. 8, is secured to the transmission housing 30 by two bolts 40 and 41 and a clamp plate 42. A removable speed adjusting plate 39, FIGS. 2 and 7, having two transverse bolt receiving notches 39a and 39b extending from one edge thereof part way across said plate is adapted to be inserted between the chain guide plate 38 and the adjacent face of the frame member 30 for the purpose of changing the gear ratio between the motor 26 and certain driven parts hereinafter described.

The chain guide plate 38 has two longitudinal slots 43 and 44 extending from its respective ends inwardly. The slot 43, FIG. 2, receives and fits over the two bolts 40 and 41. The other end of the plate 42 in which the slot 44 is provided is securely clamped between two frame members 45 and 46 by two cap screws 47 and 48 which extend through the slot 44. The two members 45 and 46 constitute a main frame assembly for my machine. The chain guide plate 38 has a groove 50 in its edges to receive and guide the sprocket chain or link belt 51 which is used for driving tools and work, as hereinafter described.

When the speed adjusting plate 39 is interposed between the chain guide plate 38 and the adjacent wall of the frame member 30 the chain guide plate 38 will be aligned with the smaller sprocket wheel 37 and the sprocket chain 51 will operate on said smaller sprocket wheel 37 providing a low gear ratio. If the speed adjusting plate 39 is removed the sprocket chain 51 will be aligned with and operate on the larger sprocket wheel 36 providing a higher gear ratio. Changing the sprocket chain 51 from a sprocket wheel of one size to a sprocket wheel of a different size is facilitated by providing means which makes possible quick and easy adjustment of the distance between the frame member 30 and the frame assembly formed by the two frame members 45 and 46 so that the chain 51 can easily be slackened and tightened and adjusted to proper tension. The slot 43 in the chain guide plate 38 facilitates this interchange of the sprocket chain 51 between the two sprocket wheels 36 and 37. The loosening of bolts 40 and 41 makes possible the removal and insertion of the plate 39 and also the necessary adjustment for proper tension of the sprocket chain 51. Adjustment between frame member 30 and the frame assembly formed by frame members 45 and 46 can also be had by loosening cap screws 47 and 48.

The part of the frame member 46 which fits against the plate 38 is relatively thick and is provided with a preferably square recess 52 within which an end portion 53 of a main track bar 54 fits and is secured by at least one cap screw 55. Preferably one or more recesses or depressions 56 are provided in the sides of the end portion 53 of the main track bar 54 to receive the ends of the screws 55 for more secure locking of the bar 54.

The frame member 45 is provided with spaced apart bearings 60 and 61 which support a shaft 62 with its axis parallel to axis of the main track bar 54. A sprocket wheel 63 is secured by a preferably tapered end portion of the shaft 62 by a key 64 or other suitable means. The sprocket chain 51 engages with and drives the sprocket wheel 63. A tubular collet 65 is secured to the sprocket wheel 63 coaxially of the shaft 62. The internal wall 65' of the collet 65 is slightly tapered convergently for purposes hereinafter explained, the outer end of said collet being of larger internal diameter than the inner end. The end of the collet 65 adjacent the sprocket wheel 63 is welded or otherwise rigidly secured to an end plate 66 which contacts said sprocket wheel 63. The shaft 62 has an axial threaded stud 67 on the end thereof which extends into the collet. A combined nut 70 and centering cone 71 threads onto the stud 67 and securely clamps the rigid end plate 66 of the collet 65 to the sprocket wheel 63. The sprocket wheel 63 has overhanging lugs 72 which seat within notches 73 in the circumferential portion of the collet end plate 66 and effectively lock the sprocket wheel 63 to the collet 65. A washer 74 is provided between the sprocket wheel 63 and the adjacent side of the frame member 45. The outer bearing 62 is held in place by a removable cover plate 75. The forward or outer end of the frame member 45 preferably has a cap 76 secured thereto by screws 77 and said cap has an outwardly extending handle 78 which facilitates handling the machine.

The collet 65 is journaled in a bearing member 79 provided in a ring shaped arm 80 which is rigid with and extends outwardly from the frame member 46. Said collet 65 is provided with preferably three equidistantly spaced radial set screws 81. The screws 81 can be tightened against any member or device which is inserted in the collet 65. Each screw 81 can be locked by a nut 82 provided thereon. FIG. 18 shows a collet 65a which can be used in place of collet 65 and is similar to collet 65 except that, on its outer end portion, it has a rigidly attached steel ring 65b providing added thickness for threaded holes 65c which receive the screws 81 and make it possible to dispense with the lock nuts 82. Also a ring 66a, similar to ring 66, is fastened by detachable means, such as screws 66b, to the inner end of collet 65a so it can be removed to facilitate servicing the collet bearing.

The previously described parts of applicant's machine shop attachment are all common to, and used in connection with, substantially all of the machine shop operations for which the attachment is adapted.

The tool set-up shown in FIG. 2 is for doing lathe work. In a general way this lathe set-up shows a work piece 85, a tool carrying arm 86, and a bearing supporting arm 87 which cooperates in holding the work piece 85.

The work piece 85 can be any piece of material capable of being inserted in the collet 65, centered by the centering cone 71, held by the screws 81, and not too long to be accommodated by the bearing supporting arm 87 which must be supported on the main track bar 54.

The bearing supporting arm 87 comprises an arm part 88 having in one end portion a square hole 90 adapted to fit over and slide on the main track bar 54. At the other end the arm part 88 has a hub 91 provided with a recess 92 within which a combined work centering cone and anti-friction bearing 93 is disposed. Said core and anti-friction bearing 93 comprises an inside conical race member 94 welded or otherwise rigidly attached to a face plate 95 which has a peripheral flange 96 adapted to removably fit over an annular hump or ridge 97 on the end portion of the hub 91 and prevent the bearing from dropping out of the hub recess 92. The flange 96 does not frictionally contact the hub 91 to an undesirable extent when the device is in operation. Bearing rollers 98 rest on and cooperate with the inside race member 94 and are provided with the usual outer conical race member 99. The bearing parts 94, 98 and 99 are all assembled on the plate 95 so said plate and bearing parts are handled as one unit. A centering cone 102 has a flange 103 which rests against the face plate 95 and has an axial shank 104 seated in the face plate 95 and inner race member 94. The centering cone 102 centers and supports one end of the work piece 85 in the usual manner. The rollers 98 are combined radial and thrust bearings which take all of the thrust and provide free rotation of the work piece supporting parts of the bearing along with the work piece. Preferably the end portion of the hub 91 opposite the centering cone and bearing 93 is hollow and tubular to provide a receptacle 100 in said hub and has radially positioned set screws 101 which can be used to hold parts if desired. Also preferably bearing knock out perforations 83, shown by dotted lines in FIG. 2, and a sight opening 84 are provided in the hub 91.

The receptacle 100 of hub 91 connects, at its inner end, with a convergent part having conical walls 100a which terminate in an axial opening 100b in the bottom of bearing recess 92. A cylindrical work piece can be centered and held and axially drilled by removing either the centering member 102, 103 or the entire bearing 93, pressing the end of the work piece against conical walls 100a to center same, clamping it with screws 101 and drilling it by the use of a drill held in the collet 65, for instance as shown in FIG. 16 and hereinafter described.

The part of the bearing supporting arm 87 which fits over the main track bar 54 is provided with preferably two set screws 106 and 107, see FIG. 4, which can be jammed against the bar 54 to securely lock the arm 87 in any desired position thereon. Preferably lock nuts 108 are provided on the set screws 106 and 107. The tip of the set screw 106 seats within a longitudinal groove 54' in the rear side or face of the main track bar 54 and usually this will lock the bearing supporting arm 87 firmly enough to the bar 54 so that it will not be necessary to tighten the set screw 107. However the set screw 107 can be tightened if desired. Providing the groove 54' in one side of the face of the main track bar 54 and positioning the set screws so that they seat in this groove 54', whenever possible, minimizes the undesirable roughening effects that these set screws have on the bar 54 because this roughening will occur in the bottom of the groove 54' and will not interfere with the movement of the several arms and like parts along the bar 54.

A feed screw nut 109, FIGS. 2 and 4, is seated within a suitable recess or bore 110 in the bearing supporting arm 87 and is locked against rotation by a set screw 111. A feed screw 105 is threaded through the nut 109.

The tool carrying arm 86, FIGS. 2, 3 and 9, comprises a block 112 having a square opening 113 extending crosswise thereof through which the main track bar 54 extends. The respective sides of the block 112 have flanges 114 and 115 extending at least partially around the square opening 113 providing a longer bearing on the bar 54 for greater stability. Slack take up screws 116 and 117 are threaded through the respective flanges 114 and 115 and have lock nuts 118 thereon. The slack take up screws 114 and 115 have flat inner ends and said screws 114 and 115 are positioned so that these flat inner screw ends can contact the rear face of the bar 54 above the groove 54' and at a location where the surface of the bar 54 is smooth and not roughened up. The slack take up screws are adjusted close enough to the bar 54 to prevent play or lost motion but not close enough to cause undesirable friction. A lock screw 120 is threaded through a boss 121 on one side of the block 112 and can be jammed against the top side of the bar 54 to lock the block 112 to the bar 54 if desired. A compression spring 122 is provided between the boss 121 and a hand wheel 123 on the upper end of the lock screw 120 to prevent loosening of said screw 120 by vibration.

The edge of the block 112 nearest the work piece 85 is provided with a lug 124 having a bore 125 through which the end portion of the feed screw 105 extends. A fixed collar 126 is provided on the feed screw 119 at one side of the lug 124 and two lock nuts 127 are provided on said feed screw 119 at the other side of the lug 124 thereby connecting the feed screw 119 with the block 112 but leaving said feed screw free to turn in the lug 124 of said block 112.

A tool holding bar 130 is adjustably supported from the block 112. Said bar 130 has two parallel support and guide rods 131 and 132 rigidly attached thereto and extending outwardly therefrom through suitable bores 133 and 134 in the block 112. The ends of the rods 131 and 132 remote from the bar 130 are connected by pins 135 with a cross yoke 136. An adjusting screw 137 is threaded into a perforation 139 in the block 112 and extends through a perforation 138 in the cross yoke 136. A rigid collar or flange 140 on the adjusting screw 137 is rotatively retained within an enlarged part 141 of the perforation 138 by a retainer member 142 which is welded to the cross yoke 136. A compression spring 143 is provided on the adjusting screw 137 between the retainer member 142 and a hand wheel 144 on the outer end of said screw 137. The spring 143 prevents the adjusting screw 137 from being rotatively moved by vibration.

The tool holding bar 130 has a notch 145 in its forward side for the reception of a tool holder 146. A tool 147 can be inserted in the tool holder 146 and clamped therein by a set screw 148 which is threaded downwardly into the tool holding bar 130 and jams tightly against the tool 147 and securely clamps the tool 147 and tool holder 146 to the bar 130. The tool 147 can be moved toward and away from the work piece 85 by rotating the adjusting screw 137 and said tool 147 can be moved along the work piece 85 by rotating the feed screw 105. Preferably the feed screw 105 is rotated by applying a ratchet wrench 150, FIG. 1, to the outer end of said feed screw.

FIGS. 5 and 6 show a tool of boring bar type capable of being used in connection with the apparatus shown in FIGS. 1, 2, 3 and 4 for boring within the inside of a tubular work piece. This boring tool comprises a cylindrical bar 151 extending through a suitable hole 152 in a holder 153. The holder 153 has a longitudinally extending slot 154 which intersects the hole 152 and makes it possible to contract the holder 153 and securely clamp the bar 151 in said holder 153. The bar 151 terminates at one end in an externally threaded shank 155 adapted to screw into an internally threaded tip member 156. The tip member 156 has an inclined tool receiving passageway 157 capable of receiving a cutting tool 158 which is held in a fixed position by a pin 160 which jams against the cutting tool 158 when the tip member is threaded tightly onto the shank 155. In using the boring apparatus shown in FIGS. 5 and 6 the tool holder 146 is replaced in the tool holding bar 130 by the holder 153 carrying the boring bar 151. A tubular work piece within which work is to be done is accurately centered and secured within the collet 65. The boring bar 151 is adjusted to properly position the tool 158 and the set screw 148 is tightened on the holder 153 to securely clamp the boring bar 151. The collet 65 is driven to rotate the tubular work piece and the boring bar is adjusted transversely by the adjusting screw 137 and is moved longitudinally by the feed screw 105 to properly apply the tool 158 to the internal wall of the tubular work piece. The shank 155 is threaded in the proper direction so that the torque exerted on the tip member 156 by the turning of a tubular work piece contacting the tool 158 will tend to tighten the tip member 156 on the shank 155. FIGS. 9 to 13 inclusive show a lathe attachment of modified form which provides a set up for doing lathe work on work pieces too long to be handled by the attachment shown in FIG. 2.

In the attachment shown in FIGS. 9 to 13 the bearing supporting arm 87 and feed screw 105 are replaced by parts of modified form but all other structure is the same as that shown in FIGS. 1 to 4 and previously described and the like parts are similarly numbered.

FIG. 9 shows a relatively long work piece 165 having one end properly centered and secured within the collet 65. At a substantial distance outwardly from the collet 65 the work piece 165 is rotatively supported by a self-centering bearing indicated in a general way by 166. The bearing 166 comprises a brass sleeve 167 with a cylindrical passageway 168 of relatively large diameter. The sleeve 167 is rotatively supported in a tubular steel bearing hub 169 on one end of a bearing supporting arm 170. The other end of the bearing supporting arm 170 has a suitable square opening 171 which fits over the main track bar 54 and is secured to said bar 54 by one or more set screws 172. The bearing supporting arm 170 is also provided with a transverse perforation 161, see also FIG. 15, within which a feed nut 162 is secured by a set screw 163. Also said arm 170 has a tubular bearing boss 164. The use of the feed nut 162 and bearing boss 164 are explained in connection with FIG. 16.

The brass bearing sleeve 167, being rotatively supported in the steel hub 169, provides a low friction long wearing bearing. Preferably a conventional grease cup 173 is provided in the hub 169 for lubricating the bearing surface of the hub 169 and sleeve 167. An end portion of the sleeve 167 is seated within a tubular shank 174 of a clamp carrying disc or flange 175. A plurality of set screws 176 can be used to firmly secure the sleeve 167 within the tubular shank 174 of the disc 175.

The outer face of the disc 175 has preferably three equidistantly spaced radial groves 177, FIG. 12, of arcuate cross section provided therein. A work holding clamp member or dog 178 is slidably disposed within each groove 177. Preferably each work holding dog 178 and the groove 177 in which it operates are slightly greater than a semi-circle in cross section so that the dog 178 can not be lifted out of the groove 177. Also preferably each dog 178 and each groove 177 are marked so that, in case of disassembly each dog can always be returned to the groove to which it was initially fitted in the interest of accuracy. Each dog 178 has a fairly wide flat face 180 approximately flush with the front surface of the disc 175. A threaded stud bolt 181 is rigid with each work holding dog 178 and extends perpendicularly outward therefrom through an inclined slot 182 in a centering disc or plate 183. Three equidistantly spaced inclined slots 182 are provided in the centering disc 183 to receive the three stud bolts 181.

The clamp carrying disc 175 and centering disc 183 have registering axial openings 184 and 185 respectively of the same diameter as the passageway 168 in the tubular bearing rib 167. An annular concentric bearing rib or member 186 protrudes from the face of the clamp carrying disc 175 around the central opening 184 thereof and a mating annular concentric groove 187 in the centering disc 183 fits over the annular bearing rib 186. The interfitting bearing rib 186 and groove 187 maintain the two parts 175 and 183 coaxial at all times.

The three equidistantly spaced slots 182 have the same incline and are at the same radial distance from the center of the disc 183 so that they always maintain the stud bolts 181 at the same distance from the axis of the disc 183 and will radially move the stud bolts 181 when the centering disc 183 is rotatively moved. The three stud bolts 181 are at the same distances from the inner ends of the respective work holding dogs 178 to which they are secured and this insures that the inner ends of said dogs 178 will always be maintained at the same radial distance from the axis of the self-centering bearing 166 and any cylindrical work piece held by said dogs will always be properly centered.

Each stud bolt 181 is provided with a nut 188. A rigid anvil block 190 is provided on the face of the work centering disc 183 to receive hammer blows which facilitate rotative adjustment of said disc 183. Preferably a mark such as a notch 189 is provided on the periphery of the disc 175 and the anvil block 190 is always positioned in registration with said notch 189 so that the studs 181 will always be received in the same slots 182 for greater accuracy. Rotary movement of the disc 183 will radially move the work holding dogs 178 equal distances making it possible to clamp work pieces of different diameters and to always have the clamped work pieces accurately centered. If desired the self-centering bearing 166 can be reversed end for end in the hub member 169. Also the position of the bearing supporting arm 170 on track bar 54 can be reversed.

The discs 175 and 183 and any long work piece, such as the work piece 165 which protrudes beyond the work centering bearing 166, would interfere with the use of a feed screw positioned similarly to the feed screw 105 of FIG. 2. To avoid this interference I use a shorter feed screw 191, FIGS. 9 and 10, which can be positioned between the main frame bracket 46 and the tool holding bracket or arm 86. One end portion of the feed screw 191 is rotatively connected with the tool arm 86 by a fixed collar 192 and nuts 193 similar to the previously described collar 126 and nuts 127. The other end portion of the feed screw 191 is threaded through a suitable perforation 194 in a clamp bracket 195. The clamp bracket 195 has a rectangular notch 196, FIG. 10, which fits over the main track bar 54 and a set screw 197 locks the bracket 195 to the bar 54. Thus the bracket 195 can be adjusted lengthwise of the bar 54 and can be applied to said bar 54 without slipping it over an end of said bar. Also said bracket 195 is reversible on the bar 54 in that it can be applied either from the top or bottom of the bar. Also the bracket 195 can be applied to the bar 54 on the other side of the tool carrying arm 86, if desired, and the feed screw 191 turned end for end.

In the operation of the structure shown in FIGS. 9 to 13, the work piece 165 is driven by the collet 65 and the tool is advanced longitudinally of the work piece by turning the feed screw 191. The feed screw 191 can be turned by applying a ratchet wrench to the end of the screw 191 shown at the right in FIG. 9.

FIGS. 14 and 15 show my machine set up for use as a grinder. In this set up the main track bar 54, the frame assembly formed by parts 45 and 46, and the driving mechanism connected therewith, including collet 65, are the same as those shown in FIGS. 1 to 13 and previously described. Also the bearing supporting arm 170 is the same as the one shown in FIG. 9. All similar parts are similarly numbered.

The grinder mechanism comprises a wheel 200 secured on a grinder shaft 201 by means including a collar 202 and nut 203. The shaft 201 has a rigidly attached cylindrical brass bearing member 204 which is rotatively received in the steel bearing hub 169 of the bearing arm 170. A dish shaped grinding shaped grinding wheel shield 205 is provided around the grinding wheel 200 and is secured by screws 206 or in any other suitable manner to the bearing arm hub 169. A substantial portion of the circumferential wall of the shield 205 is cut away or omitted to provide an access opening 207 through which work can be applied to said wheel 200. The end of the shaft 201 remote from the grinding wheel 200 is secured in the collet 65 for driving purposes. The conical centering member 71 centers the shaft 201 in the collet 65 and preferably said shaft 201 has recesses 209 in which the ends of the set screws 81 are seated to insure firm holding of said shaft. The shaft 201 is long enough to position the grinding wheel 200 just outwardly from the end of the tool carrying bar 54.

A work or tool rest 208 is supported from the outer end of the main track bar 54 in a suitable position to facilitate the support of articles which are being applied to the grinding wheel 200. The tool rest 208 comprises an arm 210 having a shank 211 extending at right angles therefrom and adapted to be threaded into a suitable axial bore 212 in the outer end of the main track bar 54. A nut 213 on the shank 211 can be jammed against the end of the bar 54 to lock the arm 210 in any desired adjusted position. A rest member 214, preferably of square cross section, is secured to the outer end of the tool rest arm 208 by a cap screw 215 and extends at right angles from said arm 208.

The grinder just described is particularly useful for sharpening the tools used in this machine but it may be used for general grinding work. When the grinder is to be used preferably the adjusting plate 39 is removed and the driving chain 51 is engaged with the larger sprocket wheel 36 to provide a drive of higher speed.

FIG. 16 shows an adaptation of my machine for use as a drill press. In said FIG. 16 the previously described main track bar 54, arm 170, bracket 195, and main frame assembly and driving parts, including the collet 65, are used and bear the same reference numerals as they do in the previously described figures. In adapting the machine for drilling purposes a conventional chuck 220 of well known form is secured within the collet 65 by the clamping screws 81. This chuck 220 has a slightly tapered end portion 221 which fits snugly within the slightly convergent receptacle formed by the inner wall 65' of the collet 65 and accurately centers the chuck 220 in said collet 65. A conventional drill 222 is received in the usual manner in the chuck 220. The bearing supporting arm 170, shown also in FIGS. 9 and 14, is used as a support for a work piece 223 to which the drill 222 is applied. The work piece 223 can be varied in shape and work pieces of some sizes and shapes may advantageously be positioned so that they rest, at least partially, within V-shaped notches 224 which are provided in the end or face of the hub part 169 of arm 170.

An L-shaped work piece clamp comprising a work holding clamp arm 225 and a threaded arm 226 is used to hold the work piece 223 against the hub 169. The work holding clamp arm 225 extends across the work piece 223 and the threaded arm 226 extends slidably through the perforated bearing boss 164 in the bearing arm 120. A tubular sleeve 227 having an internal thread 228 is threaded onto the arm 226. The sleeve 227 has an end socket 230 to which a suitable ratchet wrench may be applied to turn the sleeve and clamp the arm 225 against the work piece 223.

The work piece 223 is fed toward the drill 222 by a feed screw 231 which is threaded through the feed nut 162 in the bearing arm 170. A suitable ratchet wrench can be used to turn the feed screw 231. The feed screw 231 is rotatively supported and is held against longitudinal movement by passing the end portion of said feed screw, which is shown at the right in FIG. 16, through the transverse perforation 194 in the clamp bracket 195, see also FIG. 10, and providing said feed screw with a fixed collar 232 and lock nuts 233 on opposite sides of said bracket 195. The high speed drive is preferably used for drilling purposes.

It is also possible to use the chuck in connection with either the bearing supporting arm 87 of FIG. 2 or the bearing supporting arm 170 with self-centering bearing means 166 of FIG. 9 to hold and rotate a work piece on which either turning or a boring work is to be done.

My machine is designed for use as an attachment for a chain saw power unit but it can readily be adapted for operation by power from other sources. FIG. 17 shows, schematically and on a small scale, an instance in which my machine is connected with an electrically driven variable speed gear means. In the adaptation shown in FIG. 17 the previously described collet drive shaft 62 is replaced by a longer shaft 235 but all other parts of my machine are the same as those previously described and in so far as shown in FIG. 17, the principal parts thereof are similarly numbered.

In the set up shown in FIG. 17 the machine is supported by a bracket 236, which has one end portion secured to the chain guide plate 38 and the other end portion secured to a fixed base member 237. The collet drive shaft 235 is connected by a coupling member 238 with a countershaft 240 which is journaled in bearings 241 on the base member 237. The countershaft 240 has three gearwheels 242, 243 and 244, of different sizes fixedly secured thereon in spaced apart relation. Three other gearwheels 245, 246 and 247 are secured on the shaft 248 of a motor 249 in spaced apart relation and operatively positioned so that they can be caused to mesh with the respective gear wheels 242, 243 and 244. Preferably the motor 249 is of the speed reduction type. The motor 249 has a base 250 which is slidably movable in guide or track members 251 on the fixed base member 237. A lever 252, fulcrumed on a pin 253 has one end thereof connected by a link 254 with the motor 249 and can be used to move the motor 249 and gearwheels carried thereby and mesh selected pairs of the just mentioned gearwheels or unmesh all of said gearwheels. A lock member 255 carried by the lever 252 can be positioned in selected notches 256 in a fixed bracket 257 to hold the lever in different positions. FIG. 17 shows all of the gearwheels in unmeshed or neutral position. Movement of the motor 249 one notch to the left from this position will mesh gearwheels 245 and 242 and provide a slow speed gear; movement of said motor one notch to the right from the neutral position shown will mesh gearwheels 246 and 243 and provide intermediate speed gear; movement of the motor two notches to the right from the intermediate position will first unmesh or neutralize the intermediate gears 246 and 243 and will then mesh the high speed gears 247 and 244. Thus the gears shown in FIG. 17 will provide a low, an intermediate and a high speed drive with two neutral positions. These gears are only illustrative and many different forms of change speed gears can be used. Also some motors now available on the market are equipped with variable speed reduction gears and one of these motors can be connected directly with the shaft 235.

From the foregoing various arrangements and embodiments of the present invention, and principles and modes of operation set forth with respect thereto, it will be seen that various other modifications thereof may be undertaken within the skill of the art within the scope of the present invention, as set forth in the following claims.

I claim:
1. A power driven portable shop mechanism comprising a power unit; a transmission housing for said unit having driving chain sprockets of different sizes operatively mounted thereon; a guide plate releasably mounted on said housing having tapering end portions, each end of which guide plate has a longitudinally directed adjusting slot extending axially toward each end from the central portion, the upper and lower peripheries of said plate functioning as sprocket chain trackways; an inner and an outer frame member releasably bolted to each other through the slot in said guide plate, on which plate said frame members are mounted, said inner and outer frame members constituting a main frame assembly; a sprocket-mounting shaft which has a centering cone mounted on the outer frame member; a sprocket mounted upon said shaft aligned with the trackways of said guide plate; a sprocket chain engaging one of said driven sprockets and the sprocket on said outer frame member; a bearing mounted in one end of said inner frame concentrically with said sprocket-mounting shaft; a tubular collet journaled in said bearing carried by a ring member of said inner frame member, said collet being connected to said sprocket; a main track bar of rectangular cross-section releasably mounted on the outer end portion of said inner frame member; a bearing-supporting arm slidably mounted on said main track bar having in the outer end portion a hub carrying a centering cone in an anti-friction bearing, said cone being coaxial with said cone of said sprocket-mounting shaft; a feed screw nut fixedly disposed in said bearing-supporting arm; a feed screw threaded through said feed screw nut; a tool-carrying arm having a block through which the main track bar close-fittingly extends; a plug provided on the end of said block, through which plug the end portion of the feed screw extends in a freely rotatable retaining connection; a tool-holding bar adjustably supported on said blocking of said tool-carrying arm; and a tool holder carried by said tool-holding bar.

2. In a power driven manually portable shop mechanism, comprising a power unit, a transmission housing for said unit having a driving chain sprocket operatively mounted thereon; a combined guide and mounting plate of a required rigidity and of a contour having its peripheries tapering from the middle portion toward the ends thereof, said peripheries functioning as driving sprocket trackways; a driving sprocket chain mounted in said trackways, each end portion of said plate having axially aligned longitudinally directed slot-like openings permitting longitudinal adjustment of said guide and mounting plate for changing the mounting of said sprocket chain and for adjustment of the distance between members mounted through said slot-like openings; an inner and an outer frame member constituting a main frame assembly, each of said frame member being releasably bolted to each other through the slot means in said guide plate on which said frame member is mounted; and a sprocket aligned with said guide plate mounted in said outer frame member which position adapts it to operate a variety of mechanisms mounted on said main frame assembly.

3. A power driven manually portable shop mechanism, comprising a power unit; a transmission housing for said unit having driving chain sprockets of different sizes operatively mounted thereon providing different speed ratios; a combined guide and mounting plate of required rigidity and of a contour having its peripheries tapering from the middle portion toward the ends thereof, said peripheries functioning as driving sprocket chain trackways, each end portion of said plate having axially aligned longitudinally directed slot-like openings permitting longitudinal adjustment of said guide and mounting plate for changing the mounting of said sprocket chain and for adjustment of distance between members mounted through said slot-like openings; an inner and an outer frame member releasably bolted to each other through the slot remote from the power unit in said guide plate on which plate said frame members are mounted on said inner and outer frame members constituting a main frame assembly for mounting different tools; a sprocket aligned with said guide plate mounted on said outer frame members; a sprocket chain engaging one of said driven sprockets and the sprocket mounted on said frame member; and a power transmitting shaft operatively connected to said sprocket mounted on said frame member.

4. A power driven manually portable shop mechanism, comprising a power unit; a transmission housing for said unit having driving chain sprockets of different sizes operatively mounted thereon providing different speed ratios; a combined guide and mounting plate of required rigidity and of a contour having its peripheries tapering from the middle portion toward the ends thereof, said peripheries functioning as driving sprocket chain trackways, each end portion of said plate having axially aligned longitudinally directed slot-like openings permitting longitudinal adjustment of said guide and mounting plate for changing the mounting of said sprocket chain and for adjustment of distance between members mounted through said slot-like openings; and inner and outer frame members releasably bolted to each other through the slot remote from the power unit in said guide plate on which plate said frame members are mounted, said inner and outer frame members constituting a main frame assembly for mounting different tools; removable speed adjusting plate insertable between said combined guide and mounting plate and said housing in aligning the said plate with one of said driving chain sprockets; a sprocket aligned with said guide plate mounted on said outer frame member; a sprocket chain engaging one of said driven sprockets and the sprocket mounted on said outer frame member; and a power transmitting shaft operatively connected to said sprocket mounted on said frame member.

5. In a power driven manually portable shop mechanism, comprising a power unit, a transmission housing for said unit having a driving chain sprocket operatively mounted thereon; a combined guide and mounting plate of a required rigidity and of a contour having its peripheries tapering from the middle portion toward the ends thereof, said peripheries functioning as driving sprocket trackways and mounted on said transmission housing; a driving sprocket chain mounted in said trackways, each end portion of said plate having axially aligned longitudinally directed slot-like openings permitting longitudinal adjustment of said guide and mounting plate for changing the mounting of said sprocket chain and for adjustment of the distance between members mounted through said slot-like openings; and inner and an outer frame member constituting a main frame assembly, each of said frame members being releasably bolted to each other through the slot means in said guide plate on which said frame member is mounted; and a sprocket aligned with said guide plate mounted in said frame assembly, said frame assembly constituting a transmission mounting means; and a power transmission rotatable tool engaging member mounted by said transmission mounting means and disposed at right angles to said combined guide and mounting plate.

References Cited in the file of this patent

UNITED STATES PATENTS

| | | |
|---|---|---|
| 629,874 | Santon | Aug. 1, 1899 |
| 1,417,521 | Haumann | May 30, 1922 |
| 2,157,241 | Manning | May 9, 1939 |
| 2,175,595 | Ellison | Oct. 10, 1939 |
| 2,293,464 | Hirvonen | Aug. 18, 1942 |
| 2,481,383 | Bickel | Sept. 6, 1949 |
| 2,545,053 | Siekmann | Mar. 13, 1951 |
| 2,547,818 | Gould | Apr. 3, 1951 |
| 2,576,506 | Gates | Nov. 27, 1951 |
| 2,638,800 | Frushour | May 19, 1953 |
| 2,708,468 | Lantz | May 17, 1955 |

FOREIGN PATENTS

| | | |
|---|---|---|
| 110,447 | Sweden | Apr. 25, 1944 |